July 22, 1941.    M. G. SNELLING    2,249,867
DAMPNESS DETECTING AND INDICATING DEVICE
Filed Jan. 15, 1938
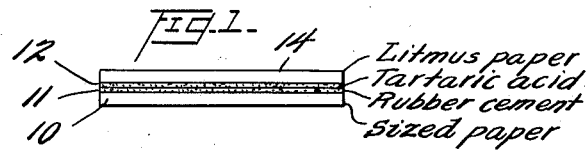
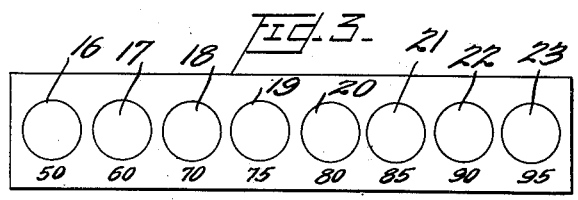
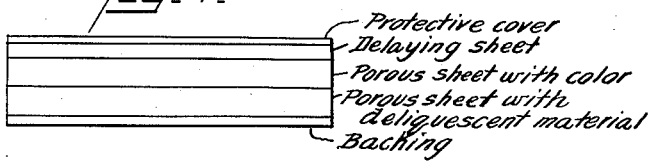
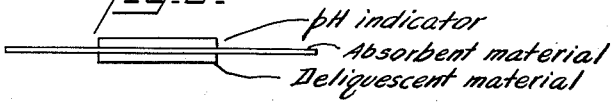
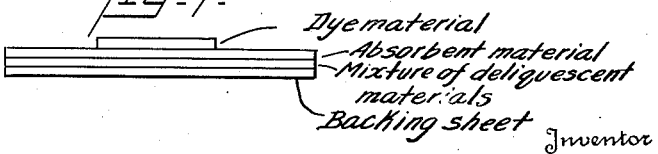
Inventor
Marjorie G. Snelling,
By Snelling & Hendricks
Attorneys Patented July 22, 1941

2,249,867

UNITED STATES PATENT OFFICE 2,249,867

DAMPNESS DETECTING AND INDICATING DEVICE

Marjorie G. Snelling, Allentown, Pa.

Application January 15, 1938, Serial No. 185,153

8 Claims. (Cl. 73—335)

My invention relates to means for detecting and permanently indicating conditions of high humidity such as are generally referred to as "dampness." More particularly my invention relates to products and devices adapted to the production of visible, irreversible and permanent markings from the effects of exposure to conditions of high relative humidity or dampness. The principal object of my invention is to provide indicating paper or other products that can be packed with goods that are liable to sustain damage when subjected to dampness, and that will afford a permanent indication if such goods or materials are subjected at any time to conditions of unfavorably high humidity. This application is a continuation in part of my application S. N. 182,373, filed December 29, 1937, now Patent No. 2,214,354.

In the practice of my invention I employ in association a dry porous solid, a dry deliquescent solid and a dry liquid-responsive agent, and I utilize color changes produced in the dry liquid-responsive agent by contact with liquid produced by the deliquescence in humid air of the deliquescent agent, to produce visible effects on the porous body. By "liquid-responsive agent" I mean a dry or substantially dry reagent, as will be hereafter more fully described, which undergoes a visible color change upon contact with or solution in the liquid produced by the absorption of water from humid air by the deliquescent solid body.

In one form of my invention the dry liquid-responsive agent may be a highly colored material, such as a water soluble dye, that is physically transportable on or through the porous solid element, by the action of the liquid produced by the deliquescence of the deliquescent material, when this deliquescent solid material is exposed to air of higher relative humity than corresponds to the vapor pressure of a saturated solution of the deliquescent solid. When exposed to air of such relative humidity, the deliquescent solid will continue to absorb moisture until the deliquescent agent dissolves in the water thus absorbed, with the production of a volume of liquid far greater than the initial volume of the deliquescent salt. The aqueous solution thus formed serves to dissolve the dye or other coloring agent, and the concentrated dye solution thus formed is transported by capillarity on or through the porous solid material, with the production of readily visible color effects. In this form of my invention all of the changes that are produced are primarily physical changes, and the absorption of water by the deliquescent agent, the resulting formation of a volume of liquid far greater than the initial volume of the dry solid deliquescent agent, the dissolving of the coloring material in this solution, and the migration of this concentrated colored solution by capillarity on or through the porous solid, with the production of visible effects may all be considered as primarily physical changes not associated with chemical changes in any of the cooperating or inter-reacting components. This form of my invention, involving changes which are in their nature mainly physical rather than chemical, has been more fully referred to and claimed in my copending application S. N. 182,373, filed December 29, 1937.

In another form of my invention the dry liquid-responsive agent may be a colorless material, or a colored material that is capable of being chemically modified in color by the action of the solution produced by the absorption of water by the deliquescent agent in humid air, or by a reagent dissolved in the solution produced by the absorption of water by the deliquescent agent in humid air. If the liquid-responsive agent is initially colorless, as for example acid phenolphthalein, it may be caused to assume a red color by the action of a solution of an alkaline deliquescent agent, or by the action of a solution produced by a neutral deliquescent agent absorbing water and dissolving an alkaline reagent, so that the ultimate solution produced as the result of the cycle has an alkaline nature. If the color-responsive agent is initially a colored body, it may be chemically modified, according to its chemical nature, in two entirely separate ways. As an example of one form of color change that I may employ to advantage in the practice of my invention, I may utilize the change in color which a colored indicator material assumes, as the result of contact with an acid or an alkaline solution produced as the result of the absorption of water by a deliquescent agent in the presence of air of high humidity, alone or after dissolving a suitable reagent of such pH value as to be capable of producing the desired color change of the indicator material. As an example of still another form that this chemical phase of my invention may take, the colored material may be selected from the group of dyes or highly colored materials that are readily bleached or decolorized by the action of suitable reagents, and the resulting visible action that occurs upon the exposure of the system to dampness will in this case take the form of the production of a solution by the absorption of water by the deliquescent agent from humid air, and the action of the resulting solution alone, or after this solution has dissolved a bleaching or decolorizing agent, in producing visible effects by the bleaching or decolorizing of the initially colored liquid-responsive agent.

It will accordingly be seen that there are four principal phases of my invention, but all four of these phases of my invention depend upon the formation of a solution when a dry solid deliquescent agent is exposed to air of such high relative humidity that the deliquescent agent absorbs moisture from this humid air and continues to thus absorb moisture until so large a volume of solution has been produced that the vapor pressure of this solution is in substantial equilibrium with the vapor pressure of the humid air. In one form of my invention the solution thus produced serves to dissolve, without chemical change, a solid dye material or other highly colored solid material soluble in the solution formed by the deliquescent agent in humid air, and the visible effects utilized in the practice of this form of my invention are the result of the purely physical migration, by capillarity, of the colored solution that is thus produced. In the second form of my invention the solution produced by the absorption of water by my deliquescent agent serves to chemically produce color in a normally colorless reagent. In the third form of my invention, the solution produced by the absorption of water by my deliquescent agent serves to modify the color of an initially colored material, with the production of a different color. In the fourth form of my invention, the solution produced by the absorption of water by my deliquescent agent serves to bleach or destroy the color of an initially colored material. All these color changes or color effects may be utilized in indicating or detecting excessively high humidity in air or other gaseous fluids.

Figure 1 is an end view of a simple form of the invention.

Figure 2 is a plan view of an embodiment employing letters.

Figure 3 is a plan view showing a plurality of areas which are wetted at different humidities.

Figure 4 is an end view of a fairly complete form of the invention.

Figures 5, 6 and 7 are end views of modifications.

As a very simple example of one form of my present invention, I may employ tartaric acid as my deliquescent solid, and I may employ slightly alkaline (blue) litmus as my color-responsive or detecting material, and I may employ ordinary filter paper as my porous solid, and with this combination of reagents I can prepare test papers that remain stable indefinitely in a neutral atmosphere of less than 80% relative humidity but which rapidly and positively indicate exposure to atmospheres in excess of 90% relative humidity, even when such exposure is of relatively short duration.

As an example of the manner in which I prepare the tartaric acid-litmus test paper, I will describe one form in which my invention may be applied. This is illustrated in Figure 1. I first coat a sheet of ordinary well-sized writing paper 10 of good quality with a thin layer of rubber cement 11. I next dust on the surface coating of the rubber cement while it is still "tacky" particles of finely ground tartaric acid 12, preferably employing material of such fineness that it will all pass through a sieve having openings smaller than .125 mm. square, and corresponding to what is usually referred to as "120 mesh to the inch" material. I next press a sheet of ordinary blue litmus paper 14, such as is used by the chemist, on the top of the sheet of paper that is coated with the rubber cement and upon which the particles of tartaric acid have been dusted or sifted, and press the assembly together, so that the rubber cement, carrying the fine particles of tartaric acid, acts to uniformly and firmly unite and cement together the base sheet of well-sized paper and the upper or cover sheet of blue litmus paper, with the intermediate layer of rubber cement and tartaric acid particles in between the two outer protecting sheets.

As long as test paper made as described is kept in a neutral atmosphere of low humidity, absolutely no change occurs in the appearance of the test paper. Although many of the particles of tartaric acid are in direct contact with the blue litmus paper and all of the particles are relatively close to the surface of the paper, it is impossible for the tartaric acid to change the color of the blue litmust paper in the absence of liquid water. If now the assembly is brought into a moist atmosphere in which the relative humidity is even slightly greater than that at which tartaric acid is deliquescent, moisture begins to pass thru the paper, and this moisture is promptly absorbed and held by the tiny particles of tartaric acid, which soon begin to deliquesce in the water which is thus absorbed. As each particle of tartaric acid dissolves in the water that it has absorbed through the porous litmus paper, the acid solution so produced touches the porous paper, and begins to spread, and thereby makes a small red spot on the surface of the litmus paper, and the original uniform blue color of the upper coating sheet of litmus paper soon acquires a speckled appearance thru the formation of the red dots on the blue background. This appearance affords a positive proof that the paper has been exposed to air having a relative humidity in excess of 80%, as tartaric acid is indefinitely stable in solid condition in atmospheres having a relative humidity lower than 80%.

By the application of my present invention I am able to make moisture detecting devices that are indefinitely stable under conditions of low humidity, but which respond in extremely short periods of time to all conditions of relative humidity in excess of the minimum for which they are designed. Some of my devices are so sensitive, and respond to moisture with such rapidity, that I even find it desirable to employ special methods of controlling their activity, as will be more fully described in a later portion of this specification.

I choose my deliquescent agent according to the minimum percentage of relative humidity at which it is desired to have the device function, and I choose my chemically reacting responsive material, in accordance with the color change desired and the chemical nature of the deliquescent agent. For example, sodium hydroxide and potassium hydroxide are highly deliquescent alkalies. They can be used with any indicator that is responsive to alkali, by being employed in exactly the same way as had already been described for the combination of tartaric acid with blue litmus. My invention is not limited, however, to the employment of deliquescent acids or deliquescent alkalies as my deliquescent agent, as I am able to produce indirect effects from the action of deliquescent agents, even when such deliquescent agents are entirely neutral in their chemical reaction. As an example of this form of my invention I may impregnate filter paper or other porous paper with a concentrated solution of gallic acid, and as pure gallic acid is white in color, the impregnated paper will show no effects from the impregnating reagent. I may now intimately incorporate calcium chloride and ferric ammonium alum, and I may dust or sieve this powdered mixture upon the surface of an adhesive, such as rubber cement, that has previously been spread over a base supporting sheet. Upon now pressing the dry sheet of porous paper on the surface of the base sheet of paper carrying the rubber cement which in turn carries the particles of calcium chloride and ferric ammonium alum, I again obtain a highly reactive moisture detecting paper. As calcium chloride is a very hygroscopic and deliquescent solid which begins to deliquesce in air of even 40% relative humidity, if test paper made as described is brought into an atmosphere containing moisture in excess of 40% relative humidity, the calcium chloride will absorb water, and will deliquesce. The aqueous solution so produced will have no direct coloring effect upon the gallic acid, but the solution formed by the deliquescence of the calcium chloride will dissolve the ferric ammonium alum, and the ferric ammonium alum thus brought into solution will promptly react with the gallic acid in the impregnated porous paper, to form dark blue or almost black spots, that form a positive indication of the test assembly having been exposed to moisture in excess of that at which calcium chloride becomes deliquescent. In the example just cited, it will of course be evident that ferric chloride or ferric nitrate could have been used initially, and would have directly produced color upon reaction with the gallic acid, but this example of an indirect color change brought about thru the intermediary action of the solution produced by the dissolving of a deliquescent salt in the water which it absorbs from moist air has been used in order to show the extraordinary versatility of my invention. I may not only employ reactants one or both of which are themselves deliquescent, for the purpose of chemically producing color, chemically modifying color, or chemically bleaching or destroying color, but I may with equal success employ pairs of non-deliquescent materials which are incapable of themselves reacting in the dry state, in combination with a deliquescent solid that will under certain conditions produce a solution by water which it absorbs from humid air, and which solution will dissolve the normally dry reactant materials to produce all of these color modifications and color changes.

It will of course be evident that the deliquescent substance that should be used for any particular type of test paper, will normally be determined by the range of relative humidity below which the device must be permanently inactive, and above which it must function. Among the considerable number of very hygroscopic materials which are suitable for the practice of my invention are zinc chloride, lithium chloride, potassium hydroxide, sodium hydroxide, calcium chloride, magnesium chloride, magnesium nitrate and sodium iodide. All or most of these substances deliquesce in atmospheres of approximately 40% humidity. Potassium carbonate, strontium bromide, ammonium acetate, nickel chloride, aluminum nitrate, copper chloride, calcium nitrate and manganese chloride are relatively stable in atmospheres of less than 45% relative humidity, but deliquesce in atmospheres of 60% relative humidity. Sodium bromide, ammonium nitrate, strontium chloride, sodium chlorate, sodium nitrate, and ammonium chloride all may be used for the range between 60% relative humidity and 80% relative humidity. For the range between 80% and 90% relative humidity, I may use urea, manganese sulfate, potassium chloride and magnesium sulfate, while for the range between 90% and 95% I prefer to use potassium nitrate, although I may also use sodium tartrate or sodium sulfate. For the range between 95% and 98% relative humidity I may use ferrous sulfate, copper sulfate, oxalic acid or potassium sulfate. It will thus be noted that a number of deliquescent substances are available, sufficient to cover the entire range of relative humidity from below 40% up to and including 98% relative humidity.

Instead of employing a single deliquescent agent, I may employ a plurality of deliquescent agents in intimate association, as in Figure 7, and I have discovered that a plurality of deliquescent agents is in all cases more actively deliquescent than a single deliquescent agent when used alone, this behavior being undoubtedly associated with the lowering of vapor pressure which results from the admixture of two hygroscopic materials. For example, ammonium nitrate alone becomes deliquescent when exposed to air having a relative humidity of 60% or higher, while sodium nitrate becomes deliquescent in relative humidities in excess of 72% to 75%. When an intimate admixture of finely pulverulent ammonium nitrate and sodium nitrate is used, the admixture is deliquescent at all relative humidities in excess of 50%, which is lower than the humidity of even the lower of the two components. A ternary mixture of ammonium nitrate, calcium nitrate and sodium nitrate likewise liquefies at a lower relative humidity than the lowest of its three components, in much the same way that certain ternary alloys melt at a lower temperature than the melting point of any of the three component metals. By utilizing this principal of admixing alkali and alkali earth chlorides and alkali earth nitrates I am able to prepare binary and ternary mixtures that are strongly deliquescent at relative humidities of from 40% to 60%, and I can also employ this principle in the preparation of binary and ternary mixtures of alkali, alkali earth and even heavy metal sulfates, carbonates, chlorates and perchlorates, as well as with a number of organic deliquescent agents.

Although I have referred to red litmus and blue litmus as examples of materials which undergo chemical change as the result of reaction with deliquescent agents of suitable pH values, I find that there are other indicators which are more suitable for practical use. In practice I have found, for example, that blue litmus is unsatisfactory for dampness detecting devices that are intended to be used in ordinary atmospheres over long periods of time, because blue litmus is not entirely stable in the atmosphere, and tends to gradually become red, probably from reaction with minute amounts of carbon dioxide. Although I am able to prevent this change by impregnating the porous paper with a mixture of blue litmus and a protecting agent such as a mild non-volatile alkali, I find that there are other indicators which are even better adapted to the practice of my invention than litmus. Nitrazine (2-4-dinitrobenzene-azo-1-naphthol-3-6-disodium disulfonate), lacmoid, rosolic acid and sodium alizarin sulfonate are examples of such indicators, but a number of the newer indicators, such as brom-phenol blue, brom-thymol blue, methyl red, and neutral red are equally good. It will of course be evident that I may employ in the practice of my invention any of the well known indicating materials, in combination with a solid deliquescent agent that is capable of modifying the color of such indicator in the form of the solution produced by its dissolving in the water which it absorbs from moist air, or in combination with a solid deliquescent agent that is normally non-reactive but which is associated with a normally reactive material. Thus, for example, I may directly employ tartaric acid and blue nitrazine paper in the making of dampness detecting devices for a high humidity range, and I may employ a mixture of tartaric acid and calcium chloride with blue nitrazine paper, in the making of dampness detecting paper for a lower humidity range. For very low humidity ranges sodium hydroxide or potassium hydroxide with yellow nitrazine paper forms a particularly sensitive combination.

In the practice of my invention I recognize three quite separate types of color changes, one being the indicator type as illustrated in Figure 6, where a change in pH produces a change in color, another being color-producing reactions, as where potentially reactive dye intermediates, or such mixtures as ferric or ferrous salts with gallic or tannic acids, or ferrous salts with ferricyanides, or ferric salts with ferrocyanides, etc. produce a color when the dry reaction mixture becomes wet. The third type of color change results from the actual bleaching or destruction of color, as when a dye becomes bleached or destroyed by the action of a hydrosulfite compound such as Rongalite or Hyraldite, or any corresponding reaction in which the color is either bleached or destroyed. In the case of nitrazine-tartaric acid paper, as well as several other sensitive indicator papers, I have noted that often there occurs a combination of indicator effect and bleaching effect. Where red phenolphthalein is used with an acid, loss of color results, but this is not due to destruction of color, and is purely an example of indicator effect. In the case of stannous chloride, hydrosulfite, and the many equivalent proprietary bleaching agents, and reducing agents, the chemical effect is usually a true destruction of the dye, although in some cases the effect is only a reversible change in color, in which case the original color is capable of being restored.

In the practice of my invention, I prefer to apply my hygroscopic agent, preferably admixed with acacia, glue, or other adhesive or binding agent, as a coating upon a base or supporting surface of paper or other fabric, preferably employing a material that is non-porous and that is impervious to moisture, and covered with a porous protecting and indicating sheet. The reason for preferring a non porous base is of course obvious, since thereby I avoid wastage of the solution produced by the dissolving of my deliquescent agent in the water which it absorbs from moist air. My reason for preferring a base that is impervious to atmospheric moisture, is to concentrate the effects that are produced, upon a single surface of my test paper. My invention is not limited, however, to such use of a sheet producing visible color changes on one side only, and I have made with equal success sheets that are porous on both sides, and that produce markings on both sides.

Instead of producing sheets that are uniformly modified in color, or that are "speckled" in a relatively uniform way, I may of course dispose one or both of my reactants to form designs, letters as shown in Figure 2, words or sentences, or in fact in any desired form, either alone or associated with other designs or wording printed on either or both sides of the test sheets 15 and made with ordinary printing ink or any other desired marking material.

In one form of my invention I may protect portions of the surface of my test paper from reaction, by coating such portions with paraffin or other wax, or with a protecting varnish, or with any other suitable impervious medium or with any suitable "resist," and in this way also I may form designs or markings, even when my reacting agents are spread in uniform layers. In special forms of my invention, instead of a porous protecting coating of filter paper or like porous material, I may even employ a coating of pulverulent particles dusted or powdered, or even sprayed, upon the adhesive that has been spread over my base surface. For example, I may coat a base surface with a cellulose lacquer or equivalent non-aqueous coating material, and I may then dust intimately mixed reactants comprising a deliquescent solid and one or more reactants capable of producing a color change in the presence of moisture, over the still adhesive surface of the coating material. I may then cover this assembly with a porous sheet of paper, or I may dust any fine pulverulent material, such as dry starch or the like, over the surface, until the surface has been completely covered. Any excess of the fine particles may then be removed by a jet of dry air, leaving a porous protecting surface over the reactant mixture, and capable of giving greater visibility to the color changes that result from the effects produced by moisture than would result in the absence of such porous coating.

It will be evident that my invention is not limited to devices producing single color changes upon exposure to only a single definite condition of moisture. I may, for example, make up a number of different mixtures, each responsive to some definite percentage of relative humidity, and I may then "spot" a base surface at any desired points or areas indicated by the numerals 16 to 23 of Figure 3 with small quantities of these different mixtures. Such a device may be packed with goods that are susceptible to damage from conditions of high humidity, and will definitely mark the highest condition of humidity which existed at any time in the interior of the package. The spots may be marked, if desired, with their percentage or relative humidity value, as represented by the relative humidity at which they will begin to function, and upon the test paper being exposed at any time to moisture sufficient to activate the reaction of the mixture present at any particular spot, the irreversible change will go on, and the test paper will thereafter bear a permanent and visible record, that will show the maximum relative humidity to which the paper was exposed.

In my work I have found it possible to make test paper that will be either rapidly sensitive or slowly sensitive to relative humidities within its responsive range. For some purposes it is preferable to have paper that will not respond to momentary exposure to high moisture content, but will respond to the same degree of dampness, if continued over any extensive period of time. I have found that by employing thin and very porous paper, I can make extremely rapid indicators of dampness, that will become permanently changed in color by exposure for as short a time as five minutes to moisture conditions higher than the responsive range of the device. For most purposes, however, this high degree of response is undesirable, and for ordinary purposes I prefer to use only moderately porous paper, of about the thickness of ordinary pencil tablet paper. Paper designed for ink writing is in general relatively non-porous, and may be used where only a very slow response to long continued conditions of high moisture are desirable.

By modifying the thickness and density of the paper that I use as my active surface I can control its porosity over a wide range, and since control of the permeability of the covering surface to atmospheric moisture determines the rapidity of response of the device, and since the porosity of the covering surface determines the speed of migration of the liquid produced by the dissolving of the deliquescent agent in the water which it absorbs from moist air, it will be evident that my invention may be modified, to meet a wide variety of conditions of response. If desired, I may use a plurality of cover sheets, employing a lower highly porous sheet, as of filter paper, to control the migration of the fluid reactant mixture, and an upper thin and relatively non-porous but air-pervious sheet, to control the rate at which moisture can find its way to the reactant mixture.

Although I may employ, and in the ordinary practice of my invention do employ as close association as possible between my deliquescent agent and the color-changing receptor or reactor material, I wish to point out that actual physical contact of the two materials is not absolutely necessary. When a deliquescent solid absorbs moisture and liquefies a very substantial change in volume occurs, the solution usually having a volume equal to two or three times the volume of the initial solid deliquescent material, and in extreme cases having a volume of more than five times the initial volume of the solid particle of deliquescent material. Accordingly, in the process of deliquescence there is an increase in volume of the deliquescent material, due to the volume of water which the deliquescent solid takes up and absorbs to form the liquid solution. This liquid solution normally migrates to a distance equal to two or three times the diameter of the particle, and accordingly a deliquescent agent can dissolve a reactant material, or can produce a change of color, at a distance of from two to three times the diameter of the particle. It is for this reason that although I prefer to have my deliquescent solid actually touching the color-changing or cooperating material in producing the color changes on which my invention depends, I recognize that actual touching of the reactant materials, one of which is a deliquescent agent, is unnecessary. Accordingly, by "intimate mechanical admixture" or "intimate mechanical association" as used in this specification and in the claims, is meant physical association of such intimacy that physical action and change between the reacting components is possible under the conditions existing in the normal use of the device. Actual touching of particles of deliquescent agent and color-changing reagent is not necessary, even though in most cases it is desirable.

I have discovered that the sensitiveness range of my dampness detecting devices is determined wholly by the deliquescent constance of the deliquescence agents employed, but the time within which my moisture detecting device will give a response, is determined by a number of factors, of which the degree of separation of the reactant materials is one. By increasing the separation between isolated particles of deliquescent agent and isolated particles or surfaces of color-changing reactant material, I can materially lengthen the time required for my device to respond to any given condition of relative humidity. Where it is desired to provide dampness detecting devices that will not show too rapid a response to momentary or temporary exposure to conditions of high humidity, I may employ this expedient as a means of modifying the time response of my devices.

In one form of my invention, in which small particles of closely associated highly sensitive reactants that become activated at very low relative humidities are employed, I have found that the extreme sensitivity of my device requires great caution to avoid premature action, and my moisture detecting sheets require special protection, in much the same way that ultra-fast photographic plates require special protection prior to their use. I have discovered that by coating such highly reactive test papers with a removable outer impervious protecting layer, such as a sheet of cellulose acetate, cellulose nitrate, or even a sheet of well-paraffined paper, I can correct this difficulty. By employing an impervious adhering protecting sheet, which can be "peeled" off from the indicating surface when desired, I can even in the case of highly sensitized reaction mixtures obtain paper that can be stored for long periods of time while still maintaining its desired sensitiveness. In one form of my invention I employ such protected highly sensitized paper as a rapid quantitative measure of humidity, the time in seconds or in minutes being noted after peeling off the protecting surface before the indicating surface matches a definite color standard of comparison.

Although I have referred to the use of rubber cement and non-porous varnishes as the preferred adhesive means to be used in securing together the coating sheets and the base sheets, and as the preferred embedding matrix in these embodiments of my invention in which powders are dusted upon "tacky" adhesive surfaces, I think it is desirable to point out that it is possible to use aqueous adhesives in the practice of my invention, if sufficient care is employed. If, for example, a mixture is first made of a deliquescent solid in a very viscous solution of acacia, alone or with one of a pair of reactants, this mixture can be spread over a base sheet, and dried rapidly in very dry air. If now a coating sheet, containing the second reactant is spread over the porous coating paper, and is partially but incompletely dried, I have found it possible to unite the two sheets by pressure, without the color change being produced. The reason for this behavior is probably to be found in the fact that two layers of adhesive material will bind together in the presence of an amount of moisture that is entirely insufficient to produce deliquescence of the deliquescent salt employed. This result can only be achieved as the result of very careful handling of these very sensitive products, however, and must be done with extreme caution to obtain satisfactory results. In general, I prefer to employ sprayed, non-aqueous adhesives, such as the well known synthetic resin adhesives, or thermoplastic adhesives that can be used at moderate pressures and low temperatures, although ordinary rubber cement and like adhesives give entirely satisfactory results with a wide range of reactant mixtures.

Although my invention is capable of embodiment in a very wide variety of forms, I prefer to employ a duplex assembly made up of a base sheet, which preferably should be non-porous and impervious to moisture, a permeable and porous cover sheet coated with or impregnated with a reagent capable of undergoing a change in color when activated by a suitable reagent, and a reagent held within the space between the two sheets of the duplex assembly, such reagent comprising a deliquescent solid material, and such reagent being capable of producing a color change upon coming in liquid contact with the color responsive material of the cover sheet. By "color responsive" is meant the undergoing of a color change, whether such color change is the production of color from a colorless initial condition (as represented by the formation of a dye from colorless dye intermediates), or the change of a dye or an indicator from colorless condition to colored condition, or the change from one color to another, (as represented by the change of red litmus to blue litmus or blue nitrazine to yellow nitrazine), or the change from colored condition to colorless condition, (as represented by the destruction or bleaching of a dye), or the change in color of an indicator from colored to colorless condition.

Although the preferred form of my invention is represented by such a duplex assembly as described, my invention is not limited to a duplex assembly. The essential elements of my invention are a color-responsive reagent in association with a color-modifying reagent comprising a deliquescent salt that upon contact with humid air of lower than 100% saturation will bring about the liquefaction of a deliquescent salt and will produce a color change in the color-responsive reagent. All these essential elements can be disposed upon a single surface as shown in Figure 5, although far better results are obtained by the use of an assembly comprising a base sheet and a color-responsive cover sheet, and a reagent comprising a deliquescent salt within the space between the two sheets. My invention can be extended, for certain specific purposes, by the use of further modifying or protecting sheets, including "peelable" impervious sheets as shown in Figure 4 for protecting the reactive elements until the dampness detecting device is desired for use, and of course the disposal of the color-responsive medium to form designs, lettering or the like, with or without modifying resisting coatings, all form modifications of my invention which have specific use for certain purposes. Instead of employing white paper, coated or impregnated solely with a color-responsive reagent, I may if desired use paper that has been first dyed with a permanent dye, and then employ the color changes of my color-responsive reagent, to produce contrasting effects, as for example, dying my cover paper with a permanent yellow dye, and then impregnating it with yellow nitrazine as my color-responsive reagent. In this case the yellow nitrazine will not change the color of the permanent yellow stain, but upon the color-responsive nitrazine becoming alkaline, the resulting effect will be green instead of blue. By suitable use of this principle, desirable contrasting color effects can be produced, for certain specific purposes.

Although I prefer to employ duplex assemblies composed of a relatively impervious base sheet and a relatively porous cover sheet, with my deliquescent agent disposed between these two sheets, like the filling of a sandwich, my invention is by no means limited to this specific physical embodiment. I have found, for example, that by saturating porous paper, such as filter paper, with a concentrated solution of a deliquescent agent, and then drying this filter paper in dry air until the deliquescent agent has been precipitated on and between the fibers of the filter paper as a solid material, I can obtain a very satisfactory intermediate material, in the practice of my present invention. Utilizing paper prepared as described, I may for example first coat a sheet of relatively impervious writing paper with rubber cement, and then firmly attach a sheet of my porous paper impregnated with deliquescent agent upon this base sheet. I may now cover this assembly with a porous sheet of paper impregnated with or colored with any suitable liquid-responsive agent, this top or cover sheet being either fastened to the intermediate sheet impregnated with deliquescent agent by mechanical means, such as staples, or by the use of a non-aqueous thermoplastic adhesive, or by any other suitable means. Such an assembly may then be provided with a "peelable" protecting sheet, which may be similarly fastened to the other elements of the assembly by sewing, staples or thermoplastic cement. Such an assembly as just described will consist of four or more separate layers, the lowest layer being an impervious base sheet, the second layer being porous paper impregnated with deliquescent agent, the third sheet being porous paper impregnated with or colored with a color-changing liquid-responsive agent, and the fourth sheet being the removable or "peelable" impervious protecting sheet, intended to protect the entire assembly from the effects of high moisture prior to the time that the device is desired for use in the packing box or other container in which it is to be used. If desired, a fifth semipermeable sheet may be employed between the removable protecting sheet and the color-changing sheet, for the purpose of controlling the rate of speed of action of the assembly.

I have discovered and developed a very large number of physical embodiments of my invention, but in every case the basic elements of my invention are the same and involve the production of visible color effects as the result of the interaction or reaction of an intimate mechanical mixture of a dry solid deliquescent agent, and a dry solid liquid-responsive agent as the result of changes produced in the dry liquid-responsive agent by a liquid produced by the deliquescence in humid air of the deliquescent agent. Whether the color changes produced in the liquid-responsive agent are physical or chemical, or whether these color changes result in the production of color, a change in color, or the bleaching or destruction of color, the change is in every case the effect of a liquid reagent produced primarily by the deliquescence of a deliquescent solid on exposure to air of sufficiently high relative humidity to cause the absorption of water by the deliquescent solid, and its ultimate liquefaction in the water which it thus absorbs.

In general, my dampness detecting and indicating devices that act thru color changes that are produced as the result of chemical action are more rapidly responsive to conditions of high relative humidity than are my corresponding devices that act purely by physical action, even when the same deliquescent agent is used in each. The reason for this behavior is to be found in the fact that the chemical reactions that produce color, modify color or destroy color are in general more rapid in their action than the physical factors of solution and capillarity that are employed in those forms of my devices in which dyes that do not change in color are employed. Against this increased rapidity of response of the chemical forms of my devices is the factor of relative permanence, and I have found that the physical forms of my device are relatively much more stable in ordinary air than are the chemical forms of my devices, due to the fact that the reaction of atmospheric air is not always neutral, and that chemically active fumes or vapors are occasionally present. For this reason, I prefer to employ the chemically active forms of my device where long storage is not important and where rapid indications of high relative humidity are desirable, while for all purposes where storage for long periods of time is more important than rapidity of action, I prefer to employ those forms of my dampness detecting and indicating devices in which only physical forces are involved in the liquefaction of a deliquescent agent from water absorbed from a humid atmosphere, the solution of a dye in the liquid so produced, and the subsequent migration of the dye solution so formed.

I do not claim as any part of my present invention irreversible moisture detecting or indicating devices in which color changes are brought about as the result of the purely physical action, without corresponding chemical change or reaction, of the liquid produced by the absorption of water by a hydroscopic deliquescent agent, as such devices form the subject matter of my co-pending application S. N. 182,373, filed December 29, 1937. My present invention is definitely limited to irreversible moisture detecting and indicating devices in which color effects or color changes are produced as the result of true chemical reactions or chemical changes of composition or structure of one or more of the chemically reactant materials. The chemical changes which I utilize in the practice of my invention may involve the production of colored bodies by the chemical reaction or combination of initially colorless chemical substances, or may involve a change in color of one or more colored chemical substances as the result of changes in chemical nature or structure, or may involve the destruction or bleaching of an initially colored material as the result of chemical change or decomposition of the colored material. In all forms of my present invention, however, the color changes which I utilize in permanently recording the effects of high humidity are the result of chemical reactions, involving changes of chemical composition or changes of chemical structure.

It will accordingly be evident that a wide variety of changes may be made without departing from the scope of the disclosure as herein made, and accordingly no limitations should be placed upon my invention except such as are indicated in the appended claims.

I claim:

1. In combination, a backing sheet, a porous sheet secured thereto by an adhesive, a deliquescent agent within the adhesive, and two materials intimately associated with said agent, said materials being normally non-reactive when dry but reacting together chemically when wetted by the moisture absorbed by the agent to produce a solution which will produce a change in color of the porous sheet where wetted.

2. A humidity tester comprising an intimate dry mixture of a deliquescent agent, and a coloring medium consisting of a plurality of materials which are normally non-reactive with each other when dry but when wetted co-act chemically to produce a color.

3. An indicator comprising an absorbent sheet having intimately associated therewith a mixture of a dry deliquescent agent, and a dry pH indicator which when wet gives one color below a certain pH value and gives a different color above such value, whereby said indicator will produce a colored solution when wetted by the water of liquefaction and such colored solution will be absorbed by the sheet.

4. A humidity tester consisting of a dry relatively opaque porous body, a series of areas of deliquescent agents in substantial contact therewith, the several areas being of deliquescent materials which liquefy at different relative humidities, and a coloring medium in each area normally nonreactive with the agent when dry but when wetted coacting chemically to produce a color, whereby the agents will become wet one after another as the moisture increases and the water thus taken by the deliquescent material from the air will wet the porous body to give visual indication of the approximate relative humidity by the number of areas of the body which are wetted.

5. A humidity tester comprising a colored porous sheet ladened with a deliquescent agent, and a plurality of relative dry materials normally non-reactive together when dry but when wetted chemically uniting to produce a solution to alter the color of the sheet.

6. A humidity tester comprising a porous sheet, a backing sheet secured thereto, a deliquescent agent between the sheets, and a plurality of relatively dry materials which when wetted will react together chemically to form a highly colored solution which penetrates the porous sheet to indicate subjection to dampness, said materials being in intimate relationship with the agent so as to be wetted thereby.

7. The device of claim 6 in which the backing sheet is relatively impermeable and in which a peelable impervious sheet covers the porous sheet until the tester is ready for use.

8. The device of claim 5 in which the chemical solution is a bleaching fluid which destroys the color of the sheet.

MARJORIE G. SNELLING.